United States Patent [19]

Hertz et al.

[11] Patent Number: 4,816,956

[45] Date of Patent: Mar. 28, 1989

[54] STRAY VOLTAGE REDUCTION APPARATUS

[75] Inventors: Claude M. Hertz; Leroy B. Ronk, deceased, late of Nokomis, Ill. by Helen A. Ronk, executrix, Nokomis, Ill.

[73] Assignee: Ronk Electrical Industries, Inc., Nokomis, Ill.

[21] Appl. No.: 161,259

[22] Filed: Feb. 23, 1988

Related U.S. Application Data

[63] Continuation of Ser. No. 675,513, Nov. 28, 1984, abandoned.

[51] Int. Cl.$^4$ .............................................. H02H 9/08
[52] U.S. Cl. ........................................ 361/42; 361/43; 361/58; 307/326; 307/327
[58] Field of Search ...................... 361/42, 58, 88, 111, 361/43; 307/326, 327, 116; 336/30, 199, 160

[56] References Cited

U.S. PATENT DOCUMENTS

| | | | |
|---|---|---|---|
| 2,087,340 | 7/1937 | Davis | 171/97 |
| 3,855,501 | 12/1974 | Agnew | 317/18 C |
| 4,456,834 | 6/1985 | Harris | 307/116 |
| 4,573,098 | 2/1986 | Williston | 361/42 |

OTHER PUBLICATIONS

"Investigations of Extraneous Voltages in Nebraska Dairies", G. R. Bodman et al., Am. Soc. Agri. Engrs., Paper #81-3510, 1981.
"Presently Used Treatments or Corrective Procedures for Stray Voltage Problems", T. C. Surbrook, Workshop on Stray Volt. in Agri., Aug. 10-11, 1983.
"The Ideal Solution to Tingle Voltage!", Hammond Mfg. Brochure, 8/83.
Ltr. from Rural Electrification Admin., 12/22/83, re 1984 Ed. of Nat'l. Elec. Safety Code, U.S. Dept. Agri., J. S. Zoller.
"Lightning Arrestors", undated, Delta Brochure, 4 pages.
"TC-101C Tape Wound Cores", Arnold Eng. Co. Catalog, 1978, pp. 1-7, 21-22, 35-36, 51-56.
"Technical Data", (undated), Carpenter Tech. Corp., 4 pages.
"Standard Handbook for Electrical Engineers", A. E. Knowlton, McGraw-Hill, 1957, 9th Ed., pp. 326-327.
"Something in the Air has Nervous Cows Doing a Barn Dance", R. Gibson, The Wall Street Journal, 11/84.
"Circuit Analysis of Stray Voltage Interrupt and Offset Devices", R. J. Gustafson et al., Am. Soc. Agri. Engrs., Paper #84-3004, 6/84.
"Results of Initial Field Installations of Magnetic Saturation Blockers for Minimization of Stray Voltage on Dairy Farms", J. Donald et al., Am. Soc. Agri. Engrs., 2/84, pp. 1-3.

Primary Examiner—Todd E. Deboer
Attorney, Agent, or Firm—Senniger, Powers, Leavitt and Roedel

[57] ABSTRACT

Stray voltage reduction apparatus for installation in an electrical power system to complete a path of electrical continuity between a primary neutral of a power distribution transformer and a grounding conductor at a service entrance, the primary neutral being also attached to a ground connection but nevertheless having a stray voltage relative to true earth which would appear on the grounding conductor at the service entrance if the primary neutral were directly connected to the grounding conductor at the service entrance. The stray voltage reduction apparatus includes a coil having turns wound around a core establishing a magnetic circuit for the coil. The core is made of a material having an initial permeability in excess of about 50,000 and being substantially saturated when the flux density is no more than about 10,000 gauss. The coil is wound around the core to have an impedance at 60 Hz. of at least approximately 750 ohms which falls in value when the volts-per-turn of the coil is not substantially less than an amount which substantially saturates the core, and reaches a value of less than an ohm when the volts-per-turn of the coil is greater than the amount which substantially saturates the core, the impedance substantially reducing the stray voltage at the grounding conductor at the service entrance. The stray voltage reduction apparatus can be combined with a power distribution transformer within or attached to the transformer tank.

20 Claims, 4 Drawing Sheets

STRAY VOLTAGE REDUCTION APPARATUS

CROSS-REFERENCE TO RELATED APPLICATION

The present application is a continuation of coassigned, copending patent application Ser. No. 675,513 filed Nov. 28, 1984 now abandoned.

BACKGROUND OF THE INVENTION

The present invention relates to stray voltage reduction apparatus for use in supplying electrical power to a service entrance to reduce stray voltages. More specifically, the present invention relates to improved stray voltage reactors and combinations of such improved stray voltage reactors with other components.

Stray voltages or neutral-to-earth (NE) voltages are an ongoing problem in many areas supplied from distribution and where current levels on the grounding systems are above the perception threshold for either animals or people. Typical locations are dairy farms, feeder and confinement operations, swimming pools, water systems, and residences. For instance, on the dairy farm, small electrical currents passing through dairy cows can cause aggravation and even mastitis, which results in milk losses and poor animal health.

Stray voltages have many sources, both from on and off the site of electrical power consumption. On-site stray voltage can be resolved through a program of upgrading and reconnecting the wiring system and its various loads. Off-site stray voltage can result from primary neutral currents, off-site faults, and marginal groundings. Steps to correct the stray voltage problems may be delayed or not undertaken at all if the power utility company believes that the problems are originating on-site and the on-site owner believes that the problems are originating with the utility off-site.

If the stray voltage is associated with the primary neutral of a distribution transformer of the utility, an isolation transformer can be installed by the owner on the site to eliminate primary neutral currents. However, the KVA (kilovoltampere) rating of the isolation transformer must be on the order of 25 KVA to isolate whole dairy barns, for example. The cost of the isolation transformer approach to stray voltage reduction is consequently quite high.

Another approach involves using an electronic circuit to sense unbalance in the system and inject cancelling voltages into a separate ground system. The cost is also relatively high and maintenance and safety considerations can become important.

"Presently Used Treatments or Corrective Procedures for Stray Voltage Problems" by T. C. Surbrook, Workshop On Stray Voltages in Agriculture, Aug. 10-11, 1983, Minneapolis, suggests in connection with FIG. 4 therein that a saturable-core reactor may be installed between the primary and secondary neutrals at the power supplier's transformer to obtain stray voltage isolation. The saturable-core reactor is there stated to be a device that offers a resistance to the flow of neutral-to-earth currents and develops a magnetically saturated core upon fault current conditions. With the core saturated, the resistance of the reactor is said to drop very low. The therestated principle of operation of the saturable core reactor is that it would offer adequate resistance to the flow of neutral current across the primary to secondary transformer bonding strap so that most of the neutral-to-earth voltage occurs across the reactor. This leaves little voltage across the resistance of ground rods and equipment to earth.

The voltage level at which saturation occurs is termed the "saturation point" herein. The saturating reactor must have a saturation point which exceeds the stray voltages which can occur in the absence of a fault, but which is less than the voltage which will be developed at the primary neutral when a fault occurs.

The theory of the saturating reactor approach, as set forth in the above-cited paper, assumes that a sufficiently high resistance can be obtained to reduce the stray voltage below the perception thresholds of animals and people with a reactor also having a practical saturation point and current rating. In actuality, the resistance requirement and the saturation point requirements conflict. As a practical matter, many agricultural areas have a relatively high ground resistance which means that a very high resistance of the saturating reactor is required but cannot be obtained because a practical saturation point and current rating are also needed. Saturating reactors of even a fraction of the required stray voltage reducing characteristics are so bulky and expensive and inconvenient to install that they would be impractical.

Furthermore, a reactor actually presents an AC impedance, and not a resistance, strictly speaking. Consequently, the reactor actually causes a reactive voltage drop, which is 90° out of phase with the voltage resistively developed across the ground impedance. As a result, the resistively developed voltage across the ground impedance is not reduced as much as it would be if the reactor caused a resistive voltage drop. The reactive voltage drop in currently known stray voltage reactors would not adequately reduce the stray voltage to which the animals are exposed when the ground resistance is as high as it is in many localities.

In view of the above considerations, the saturating reactor approach appears to be generally impractical. Unless a manufacturer is prepared to consider foregoing marketing in areas having high ground impedances and to have the ground impedance determined at each purchaser's site to be sure the saturating reactor will perform the function intended for it, there is little reason to make stray voltage reactors commercially available except as a low volume, high cost item.

SUMMARY OF THE INVENTION

Among the objects of the present invention are to provide improved apparatus for eliminating the off-site contribution to the stray voltage problem so that any remaining problems have to be on-site in nature and can be handled and resolved accordingly; to provide such improved apparatus without discarding the saturating reactor approach; to provide such improved apparatus which can effectively reduce the stray voltage below the perception thresholds of animals and people even in localities having relatively high ground resistance; to provide such improved apparatus which has very high impedance levels with practical saturation point and current ratings; to provide such improved apparatus which does not depend on external controls or internal logic signals; to provide such improved apparatus which reacts instantaneously, providing immediate continuous protection at all times; to provide such improved apparatus which maintains the safety of the customer service while effectively eliminating any off-site contribution to the customer's stray voltage problems; and to provide such improved apparatus which is relatively durable and light in weight for convenient mounting on a power pole or in or near a service box.

Other objects and features will be in part apparent and in part pointed out hereinafter.

Generally, one form of the invention is stray voltage reduction apparatus for installation in an electrical power system to complete a path of electrical continuity between a primary neutral of a power distribution transformer and a grounding conductor at a service entrance, the primary neutral being also attached to a ground connection but nevertheless having a stray voltage relative to true earth which would appear on the grounding conductor at the service entrance if the primary neutral were directly connected to the grounding conductor at the service entrance. The stray voltage reduction apparatus includes a coil having turns wound around a core establishing a magnetic circuit for the coil. The core is made of a material having an initial permeability in excess of about 50,000 and being substantially saturated when the flux density is no more than about 10,000 gauss. The coil is wound around the core to have an impedance at 60 Hz. of at least approximately 750 ohms which falls in value when the volts-per-turn of the coil is not substantially less than an amount which substantially saturates the core, and reaches a value of less than an ohm when the volts-per-turn of the coil is greater than the amount which substantially saturates the core, the impedance substantially reducing the stray voltage at the grounding conductor at the service entrance.

In general, another form of the invention is electrical apparatus for use in supplying electrical power to a service entrance having a grounding conductor. The electrical apparatus includes a power distribution transformer having a secondary neutral attachable to the grounding conductor at the service entrance and a primary neutral attachable to a ground connection which when the transformer is energized would nevertheless present a stray voltage relative to true earth on the grounding conductor at the service entrance if the primary and secondary neutrals were directly connected to each other. Further included is a unit having a magnetizable core and a coil having turns wound around the core. The coil is connected between the primary neutral and the secondary neutral of the power distribution transformer. The core establishes a magnetic circuit for the coil which is magnetically isolated from the power distribution transformer and made of a material having an initial permeability in excess of about 50,000 and which is substantially saturated when the flux density is no more than about 10,000 gauss. The coil is wound around the core to have an impedance at 60 Hz. of at least approximately 750 ohms which falls in value when the volts-per-turn of the coil is not substantially less than an amount which saturates of the core, and reaches a value of less than an ohm when the volts-per-turn of the coil is greater than the amount which substantially saturates the core, whereby the stray voltage is substantially reduced.

BRIEF DESCRIPTION OF THE DRAWINGS

Corresponding reference characters indicate corresponding parts throughout the several views of the drawings.

DETAILED DESCRIPTION OF PREFERRED EMBODIMENTS

The impedance Z in ohms of a coil wound around a core is approximated by the formula $$Z = k_1 f N^2 A / p \qquad (1)$$

where N is the number of turns in the coil, f is the frequency (such as 60 Hz.), A is the cross-sectional area of the core, p is the length of the magnetic path or circuit in the core, and $k_1$ is a constant of proportionality.

In the past an inductance which was used in a saturating reactor at the service entrance was relatively large and on the order of 0.3 henries. The impedance at 60 Hz. of such inductance was about 110 ohms ($2 \times pi \times 60$ Hz.$\times 0.3$ henries). The saturation point was on the order of 35 volts. For a given transformer steel the saturation point, here designated $V_s$, is given by the formula $$V_s = k_2 f N B A \qquad (2)$$

where f is the frequency, N is the number of turns, B is a saturating flux density in gauss of the core, A is the crosssectional area of the core and $k_2$ is another proportionality constant. Saturation of core steel occurs at about 18,000 to 20,000 gauss.

The stray voltage to which animals are exposed should be kept as far below half a volt as possible. Stray voltage can rise to levels of from 5 to 15 volts and more, even though there is no fault condition. Accordingly, a voltage division of at least ten to one is needed to reduce the stray voltage below 0.5 volt. In areas of relatively moist earth and consequent low ground impedance on the order of 10 ohms (resistive) or less, a 0.3 henry saturating reactor with its 110 ohm impedance and 35 volt saturation point might provide a barely adequate stray voltage reduction when the stray voltage is 5 volts or less. Many areas, however, have ground impedances of 25 ohms, 50 ohms, and even higher values on the order of 100 ohms resistive. And when the stray voltage is between 5 volts and the saturation point such a prior art saturating reactor does not reduce the stray voltage below the perception threshold.

To even further complicate matters, an impedance on the order of even 100 ohms becomes very expensive to provide, if not impossible, in systems having relatively high current ratings. This is because the cross-sectional area of the turns (wire size) must be large enough to carry fault current when a fault occurs. The larger the wire size, the bigger the reactor must be. The bigger the reactor, the longer is its magnetic path. Referring to Equation (1), a longer magnetic path reduces the impedance. Thus, more turns must be provided, but more turns increases the saturating point $V_s$ as indicated by Equation (2). Then the area A must be reduced to meet the saturating point desired for the system, which reduces impedance. These considerations lead to a vicious circle that results in a very heavy, difficult to install, and expensive reactor to meet the impedance, current rating, and saturating point requirements, if they can be met at all.

Figure 1:
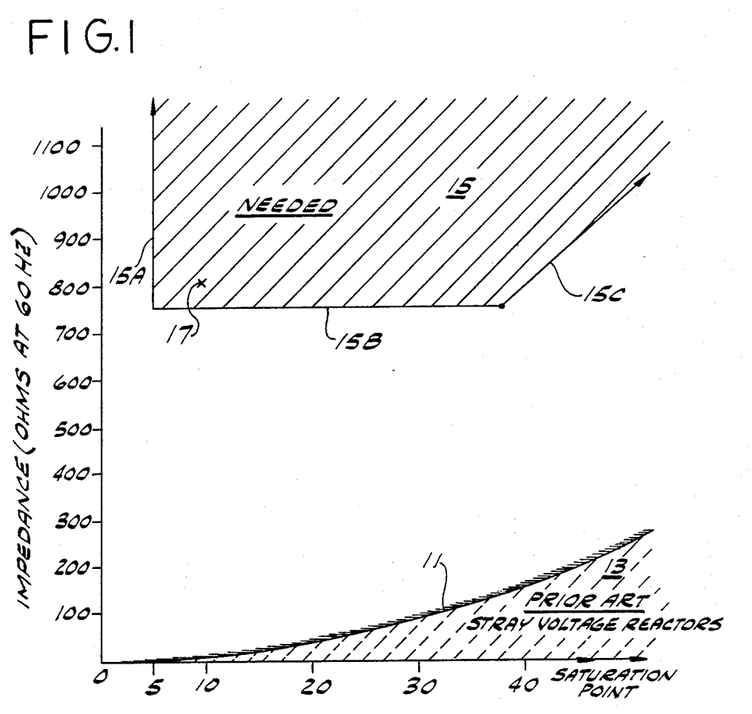
FIG. 1 is a graphical representation of impedance in ohms at 60 Hz. versus saturation point in volts for stray voltage reduction apparatus of the invention as compared to prior art apparatus.

FIG. 1 summarizes the dilemma which has been presented by the saturating reactor approach to stray voltage reduction. A boundary 11, which is parabolic in form, generally suggests the maximum impedance which can be obtained with prior art stray voltage reactors as a function of the saturation point. The parabolic form results from the turns-squared ($N^2$) factor in Equation (1) as compared with the first-power turns (N) factor in Equation (2). The boundary 11 is drawn with some breadth because electrical steel does not saturate at a distinct threshold of flux density. A shaded area 13 below boundary 11 illustrates typical values of impedance which are also readily attainable in the prior art because they are lower in value than the value on the boundary for a given saturating point.

A zone 15 of FIG. 1, by contrast, indicates a region of values of impedance and saturating point for which the invention is needed to satisfy the wide range of actual stray voltage reduction needs encountered in the field. It is apparent from FIG. 1 that zone 15 is separated by a wide gap from the area 13 occupied by prior art stray voltage reactors. Zone 15 has a left vertical boundary 15A at a saturation point of 5 volts, a lower horizontal boundary 15B at an impedance of 750 ohms, and a right slanting boundary 15C. Boundary 15C represents the higher impedances which are required at higher stray voltages to keep the voltage drop across a relatively small ground impedance below the perception threshold. Zone 15 extends upward to infinity, as indicated by the arrowheads marked on boundaries 15A and 15C.

By way of illustration, a point 17 in the zone 15 represents stray voltage reduction apparatus of the invention which has an impedance of 800 ohms and a saturation point of 10 volts. It is to be understood that FIG. 1 as a whole does not merely represent the characteristics of only one stray voltage reactor. Each point which could be marked in the zone 15 represents a different stray voltage reactor of the invention. FIG. 1 as whole summarizes the characteristics of a multitude of stray voltage reactors having different impedance and saturation point characteristics in a manner clearly showing the limitations of the prior art. Without showing variables such as number of turns, core cross-sectional area, magnetic path length, etc. which are adjusted by the skilled worker, FIG. 1 concisely illustrates that a person in the prior art solving equations would probably be able to find one or more solutions to satisfy performance requirements for a stray voltage reactor specified by any given point on or below boundary 11. On the other hand, it is not believed that the prior art could meet the requirements represented by any given point in the zone 15.

Figure 2:
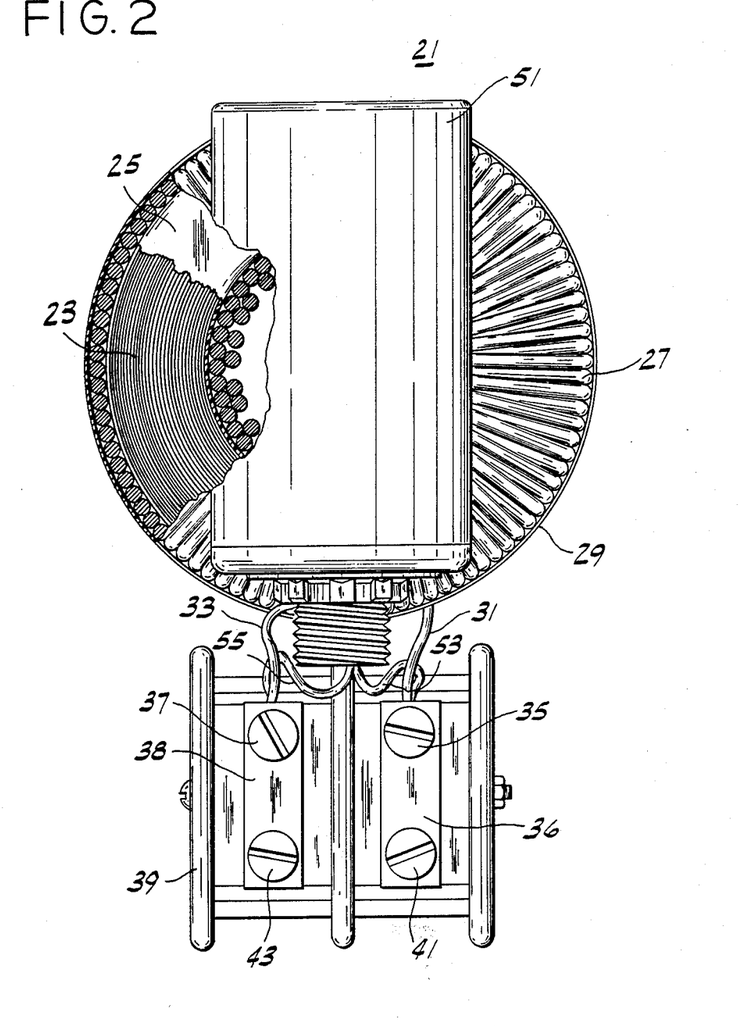
FIG. 2 is an elevation, partly cut away, of internal components of stray voltage reduction apparatus of the invention.

FIG. 2 shows a preferred embodiment of a stray voltage reduction apparatus 21 of the invention. Apparatus 21 has a toroidal core 23 bathed in silicone cushioning oil and surrounded by a protective nylon case or layer 25 on which is wound a coil 27 of enameled wire. A protective wrap of electrical tape 29 is applied around coil 27. A pair of wire ends 31 and 33 of the coil 27 are connected to respective screw terminals 35 and 37 of a terminal block 39. External connections to the coil 27 are made by means of two screw terminals 41 and 43 which are electrically connected respectively to screw terminals 35 and 37 by conductive bars 36 and 38. Associated with coil 27 is a silicon oxide varistor (SOV) 51. SOV 51 has two conductors 53 and 55 which are connected to screw terminals 35 and 37 in parallel with the wire ends 31 and 33 of coil 27. Silicon oxide varistor 51, which is described in U.S. Pat. No. 3,764,854, is rated for voltages not exceeding 100 volts, and is commercially available as Model LA 101 from Delta Lightning Arrestors, Big Spring, Tex. SOV 51 has two internal conductors (not shown) separated from one another and extending into a sandy material surrounded by a container. SOV 51 constitutes means connected across the coil 27 for passing any high frequency electrical surges around the coil.

An important departure in the present invention is the recognition that performance in region 15 of FIG. 1 simply cannot be obtained so long as conventional electrical steel is assumed to be the core material. Conventional electrical steel has only a moderate permeability. As a result, the impedance is relatively low, as illustrated by area 13 of FIG. 1. Also, such steel saturates over a somewhat indistinct range, which means that a significant impedance can be undesirably presented to fault voltages.

"Permeability" as the term is used herein, is a unitless constant relating the actual permeability of the core material to the permeability of free space. The permeability of free space is a constant having a value of $4 pi \times 10^{-7}$, or $1.257 \times 10^{-6}$, henries per meter. Thus a conventional transformer steel having a permeability of 20,000 has a permeability 20,000 times that of free space, or 0.02514 henries per meter.

The permeability of actual core materials is, however, not a constant independent of the current flowing through the coil. Because of this fact, it is useful to speak of initial permeability and maximum permeability. Initial permeability is the permeability measured under very low root-mean-square (r.m.s) current conditions, and maximum permeability is the highest value of permeability of the core measured when the r.m.s. current is increased.

The impedance of an inductor made of conventional electrical steel rises to a maximum and then falls as the voltage is increased. The fall in impedance occurs to a significant degree even when the volts-per-turn is considerably less than an amount which saturates the core. Consequently, at the higher stray voltages where the stray voltage reduction is most needed, a reactor made of conventional electrical steel fails to provide the needed impedance. Furthermore, the initial permeability of conventional electrical steel has a very low value, usually less than 10% of its maximum permeability. Consequently, even low stray voltages may not be adequately reduced by a stray voltage reactor made of conventional electrical steel because the impedance does not approach the maximum. The initial permeability should preferably be at least 30% of the maximum permeability. And, as pointed out above, in conventional electrical steel even the maximum impedance (boundary 11 of FIG. 1) is far below what is needed.

Very high permeability materials are known, but in the art they have ordinarily been dismissed out of hand as impractical for higher power applications and too expensive. By contrast, the present invention recognizes that the low saturation (approximately 8 kilogauss) characteristics of these materials are actually an advantage which suits them for stray voltage reduction apparatus in power distribution systems handling many KVA. Compared to the expense of other approaches to the stray voltage problem, as discussed in the Background of the Invention, hereinabove, the cost of the very high permeability materials is very competitive because only modest amounts of such materials turn out to be actually needed for the core.

In one example of construction of a preferred embodiment of apparatus 21, core 23 of FIG. 2 is a tape-wound toroid made of a very high permeability material ordinarily intended for low power applications. The toroid is a ribbon of very high permeability material wound like a roll of tape in annular, or doughnut-shaped, toroidal form. The core 23 illustratively is made of Supermalloy (80% nickel, 5% molybdenum, and balance of iron), which is processed for a minimum initial permeability of 60,000 and has a saturation induction of 8200 gauss. Supermalloy is one of several alloys which have approximately 80% nickel, molybdenum in a range of 3% to 6% and the balance being iron. Other alloys can also be used in the practice of the invention. Core 23 has a core area of 0.938 square inches, a net core cross section of 5.140 square centimeters with 0.002 inch material thickness, mean path length of 24.936 centimeters, 2.5 inch inside diameter, 3.75 inch outside diameter, 1.5 inch height, a weight of 2.7425 pounds, and a window area of 4.345 square inches. Such a core is available as core type 4T 5690 from Arnold Engineering Company, Marengo, Ill.

A coil having 100 turns of #9 AWG enameled wire is wound around the core so that the core establishes a magnetic circuit for the coil. The coil has an impedance at 60 Hz. of at least 750 ohms which falls in value when the volts-per-turn of the coil (volts applied to the coil divided by the number of turns) is not substantially less than an amount which saturates the core.

The 750 ohm minimum level is motivated by the consideration that most agricultural areas have a ground resistance of 75 ohms or less, and that when stray voltage is a problem, the primary neutral voltage can usually rise to at least 5 volts. Accordingly, to drop the stray voltage below the 0.5 volt perception threshold for animals and people, a ten-to-one voltage divider is needed. This means that the stray voltage reduction apparatus should have an impedance of at least ten times the 75 ohm ground resistance, or approximately 750 ohms.

In FIG. 1 the minimum saturation point of at least 5 volts, represented by the 5 volt vertical left boundary 15A of zone 15, is understood by again recognizing that when stray voltage is a problem, the primary neutral voltage can usually rise to at least 5 volts. Accordingly, if the saturation point of the stray voltage reduction apparatus 21 were made lower than 5 volts, the core would saturate on stray voltage and pass it through to the service entrance. This means that the stray voltage would not in fact be reduced, and thus saturation points of less than 5 volts are not needed and do not lie within the "Needed" region of FIG. 1.

The 750 ohm boundary 15B is extended horizontally in FIG. 1 to the highest value of saturation point at which it is likely that 750 ohms would be of value in stray voltage reduction in localities having ground resistance on the order of 10 ohms. The stray voltage reduction is 75 to 1 in such case, and assuming the perception threshold is 0.5 volts, the highest saturation point on the 750 ohm boundary 15B is 37.5 volts.

The upwardly-sloping boundary 15C is defined by increasing the impedance as needed to drop the voltage at the saturation point to a value no greater than the 0.5 volt assumed threshold level when the ground impedance is 10 ohms. The impedance boundary 15C is given by the formula $$Z = (V_s/0.5) \times 10 \text{ ohms} \tag{3}$$

and lies on a line which, when extended, passes through origin O of FIG. 1.

Figure 3:
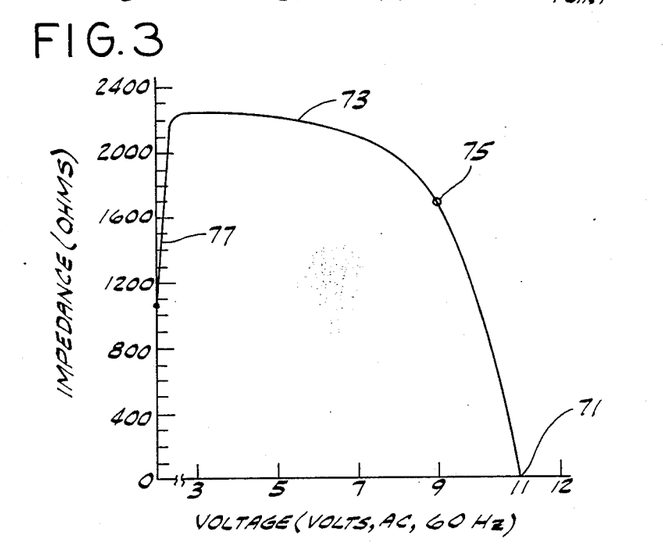
FIG. 3 is a graph of impedance in ohms at 60 Hz. versus voltage applied to stray voltage reduction apparatus of the invention.

It is to be understood that when stray voltage is a problem, the primary neutral voltage can often exceed the 5 volt level. Thus, a 5 volt saturation point is a minimum. FIG. 3 shows that for the FIG. 2 example embodiment with 100 turns of #9 wire on an Arnold 4T 5690 core, the saturation point 71 is 11 volts to accomodate most levels of stray voltage which are likely to arise in rural electrical systems. The impedance for stray voltages of 8 volts or less, as indicated by curve portion 73, is above 2000 ohms, for an extra margin of certainty in stray voltage reduction for sensitive animals and in areas of ground resistance on the order of even 100 ohms. The core and coil are so arranged and constructed in dimensions and turns that the core is saturated by a 60 Hz. voltage having a voltage value between 5 and 15 volts. In other words, when the core and coil are tested with a 60 Hz. test voltage, even though the apparatus 21 is useful at other frequencies, saturation should occur for at least one voltage value in the range 5 to 15 volts in a category of preferred embodiments adapted for most rural electrical systems.

The term "saturation point" for the present purposes denotes the value of r.m.s. voltage applied to apparatus 21 at which the impedance magnitude becomes insignificant (e.g. less than 5%) compared to the maximum impedance presented by the apparatus 21 for any lower value of voltage. The impedance magnitude is the ratio of the r.m.s. voltage applied to the apparatus 21 divided by the r.m.s. current flowing through it. Referring to FIG. 3, the maximum impedance is about 2250 ohms, which corresponds to a maximum inductance of 6.1 henries and a permeability of 200,000. The initial permeability is 92,000 for a small signal inductance of 2.81 henries and corresponding impedance of 1060 ohms. The saturation point is about 11 volts, because at 11 volts the impedance magnitude has dropped below about 100 ohms (5% of 2250 ohms). The saturation point is also called the "blocking voltage" in the present work. The preferred embodiment just described would be represented in FIG. 1 by a point having an x-axis value of 11 and a y-axis value of 2250, which lies in region 15 far above point 17 and off the vertical scale of the illustration.

A value of voltage, or volts-per-turn, within approximately 30% of the saturation point is not substantially less than the amount which saturates the core for the present purposes. As can be seen from FIG. 3 the impedance begins to rapidly fall in value beginning at a knee point 75 of about 9 volts (0.09 volts-per-turn), which is only about 20% lower than the 11 volt saturation point. The knee can be regarded as occurring at that voltage where the impedance is 75% of its maximum value (9 volts at an impedance of about 1600 ohms in FIG. 3).

Because of the relatively sharp saturation characteristic, system safety is enhanced in the event of a fault.

Compared to ordinary electrical steel, the high permeability material used in the stray voltage reduction apparatus 21 thus keeps the impedance relatively high even as the stray voltage increases. Stray voltage reduction action is most important for a given impedance level at the upper end of the stray voltage range in FIG. 3, of course, because that is where the stray voltage is highest. The high initial permeability of the material prevents stray voltage from leaking through at lower values of stray voltage too (see curve portion 77).

The impedance magnitude of the apparatus 21 preferably drops below one ohm when the volts-per-turn of the coil is greater than the amount which saturates the core and preferably when the volts-per-turn is less than half-again the voltage at knee point 75. In fact, in the preferred embodiment with the impedance curve shown in FIG. 3, the impedance magnitude of the apparatus 21 drops to less than an ohm at 0.12 volts-per-turn, which is only about 33% greater than the 0.09 volts-per-turn amount at knee point 75. Compared to the 2250 ohm maximum impedance of FIG. 3, the impedance at saturation is on the order of 0.01% or 1/10000, a factor which is herein called the impedance ratio.

Apparatus 21 of FIG. 2 as described by the graph of FIG. 3 thus constitutes a coil having turns wound around a core establishing a magnetic circuit for the coil, the core being made of a material having an initial permeability in excess of about 50,000 and being substantially saturated when the flux density is no more than about 10,000 gauss, the coil being wound around the core to have an impedance at 60 Hz. of at least approximately 750 ohms which falls in value when the volts-per-turn of the coil is not substantially less than an amount which substantially saturates the core, and reaches a value of less than an ohm when the volts-per-turn of the coil is greater than the amount which substantially saturates the core.

In another preferred embodiment, for use in very high power, high current systems, the saturation point is selected to be 95 volts and the impedance at 60 Hz. is 70,000 ohms. Assuming a 100 ohm ground resistance, a 70 volt stray voltage is reduced by a factor of 700 (70,000/100) down to 0.10 volt, which is well below the perception threshold. It is to be understood that for safety reasons a saturation point is selected which is still less than the minimum voltage which is expected to occur when and if there is a fault in the system. A saturation point of 95 volts is a very high value which is only applicable in a system sufficiently high in power that if a fault occurs, the fault voltage developed at the primary neutral will actually be at least 95 volts. The example just given of 70,000 ohms and 95 volts saturation point, is of course off the scales of FIG. 1. However, if the prior art can develop only about 100 ohms at 35 volts saturation point, then raising the saturation point by a factor of 95/35 only permits an increase in the prior art impedance to 737 ohms (100 ohms$\times(95/35)^2$) due to the parabolic shape of boundary 11. On the other hand, 70,000 ohms is well within the capabilities of the invention, since 2250 ohms$\times(95/11)^2$ exceeds 70,000 ohms.

Figure 4:
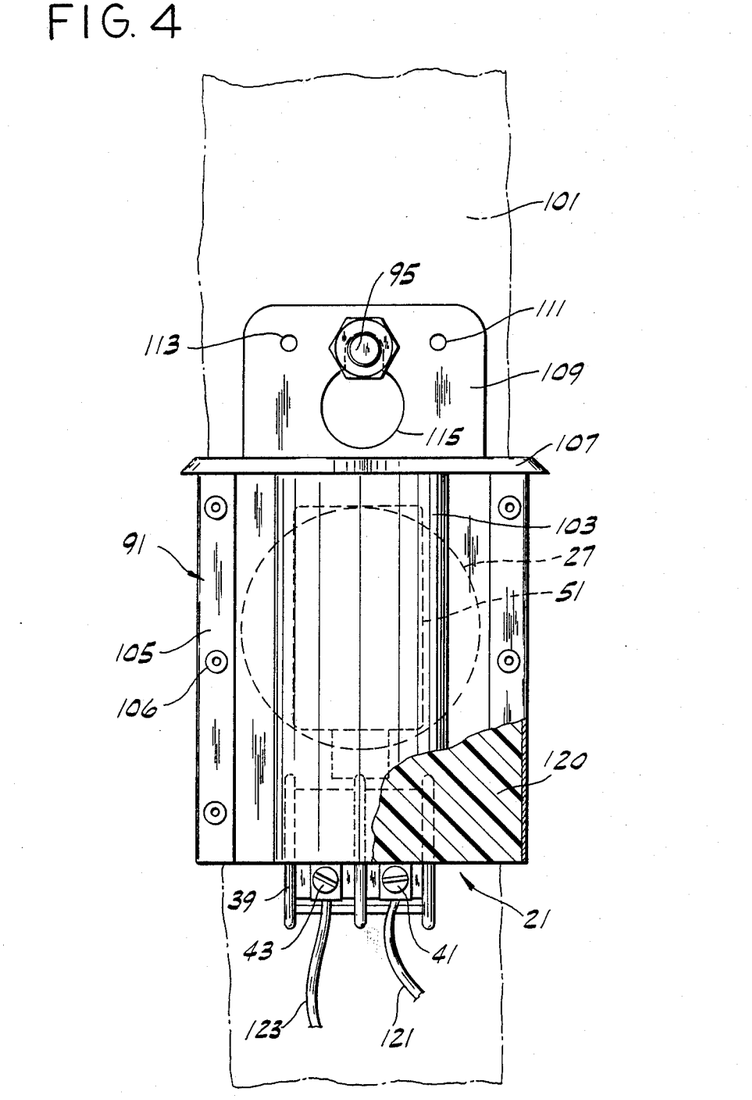
FIG. 4 is an elevation, partly cut away, of the exterior of stray voltage reduction apparatus of the invention mounted on a power pole.

FIG. 4 shows stray voltage reduction apparatus 21 completely assembled in a sheet aluminum container 91 and mounted by a bolt 95 on a power pole 101. Apparatus 21 should not be accidentally dropped during installation, to avoid an unintended reduction in the permeability of the toroidal core 23. Container 91 has an elongated arch-shaped cover plate 103 for snugly admitting SOV 51. Cover plate 103 is fastened to a U-shaped back plate 105 by means of six rivets 106. A top plate 107 of generally pentagonal outline is spot welded to a U-shaped bracket (not shown, inside container 91) which in turn is spot welded to the sides of back plate 105, firmly holding top plate 107 against the rest of the container 91. A flat mounting plate 109 is riveted to the back plate 105. Mounting plate 109 has two small diameter mounting holes 111 and 113 and a large key-shaped mounting slot 115 for admitting spikes, screws, bolts and other hardware for convenient mounting on power pole 101.

In manufacture, container 91 is turned upside down. The core and coil 27, SOV 51, and terminal block 39 are inserted into container 91, and insulating spacers are used to keep them clear of container 91. A potting compound 120 is poured into and fills container 91. The potting compound 120 cures in container 91, hermetically sealing and holding the core and coil, SOV 51 and part of terminal block 39. Terminal block 39 remains partly exposed so that a pair of external conductors 121 and 123 can be connected to terminals 41 and 43 respectively.

Figure 5:
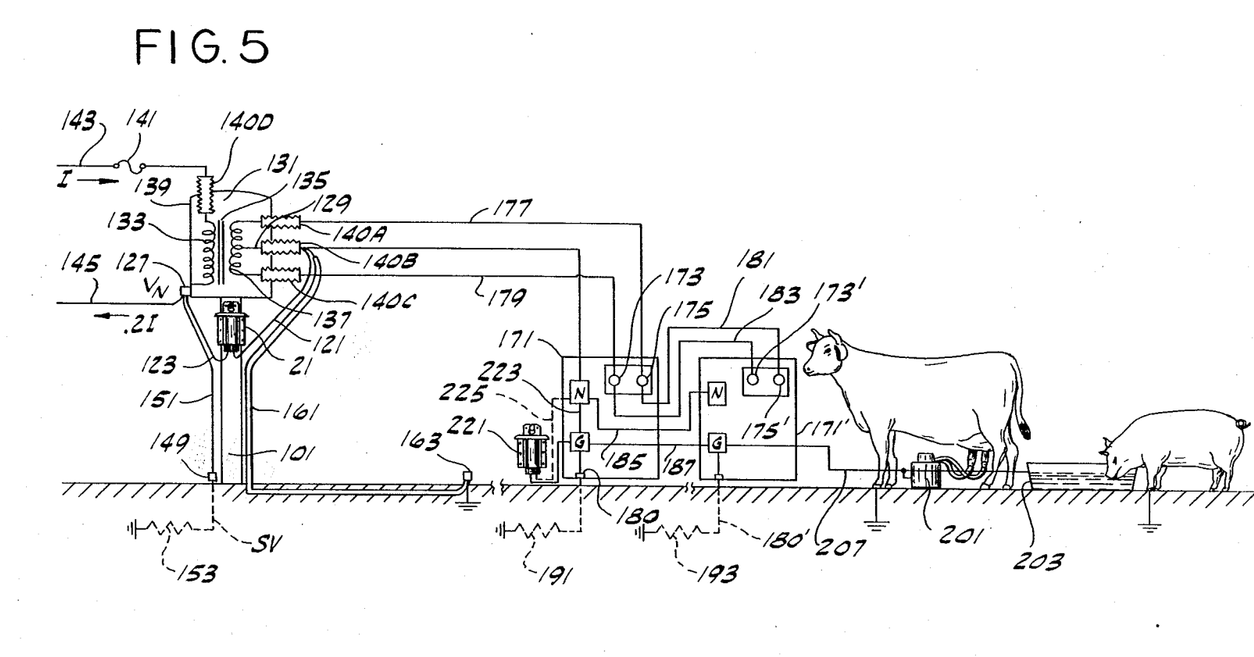
FIG. 5 is a partially schematic, partially pictorial view of a farmstead power distribution system including stray voltage reduction apparatus of the invention.

As shown in FIG. 5, apparatus 21 is connected by means of the conductors 121 and 123 between a primary neutral 127 and a secondary neutral 129 of a 25 KVA distribution transformer 131. Distribution transformer 131 has a primary winding 133, a transformer core 135, and a center-tapped secondary winding 137 in a transformer case or tank 139. Bushings 140A, 140B, 140C, and 140D are provided to insulate conductors where they pass through the tank 139.

A fuse 141 protects a power line 143 feeding transformer 131 by "blowing" when the primary current I reaches an excessive level due to a fault. The primary winding 133 is part of a utility's larger wye-connected system, not shown, and has the primary neutral 127 returned to the system through a neutral line 145 and a ground connection 149 to which the primary neutral is connected by a wire 151. Neutral line 145 is grounded about every quarter mile along a utility transmission line.

When a current I flows to primary winding 133, only about 20% of the current (0.2i) is returned by the neutral line 145. The other 80% flows through the ground back to the system. The current flowing into the ground produces a stray voltage SV. The ratio of stray voltage SV to the current flowing into the ground is regarded as resulting from a ground resistance 153 to reference earth.

The secondary neutral 129 is connected by an insulated wire 161 to a second ground connection 163 which is located at least 6 feet away from ground connection 149. If ground connection 163 fails, apparatus 21 provides a current path to ground connection 149 in the event of a primary to secondary short in transformer 131.

A service entrance 171 is connected at terminals 173 and 175 to a pair of secondary lines 177 and 179 in a conventional triplex from the distribution transformer 131. The secondary neutral 129 of transformer 131 is connected to a neutral terminal N of service entrance 171. A ground terminal G of service entrance 171 is directly connected to the neutral terminal N and to a grounding conductor 180. A second service entrance 171' has terminals 173' and 175' for power voltages, a ground terminal G and a neutral terminal N. The second service entrance 171' is provided for a building such as a dairy barn and is four-wire connected by lines 181, 183, 185, and 187 to the first service entrance 171. Ground terminal G of service entrance 171' is connected to another grounding conductor 180'. Grounding conductors 180 and 180' are returned to the earth, which presents ground resistances 191 and 193, respectively.

Ground terminal G of service entrance 171' is connected to the ground of a milking machine 201 for a dairy cow and to plumbing feeding a watering tank 203 for a pig. If stray voltage arises on the grounding system of the service entrances, the cow and the pig can be adversely affected when the stray voltage exceeds their perception thresholds. The cow and the pig are essentially in parallel with the resistances 191 and 193. The stray voltage at grounding terminals G causes an irritating stray current to pass through the animals to ground. Improving the grounding of the cow and the pig by various means, not shown, only makes the irritation worse because only the electrical resistance of the cow and the pig's bodies then limits the current. Milk production from the cow and weight gain of the pig are reduced. On the other hand, providing apparatus 21 as shown essentially eliminates the irritation problems.

With a 7200 volt, 7 ampere primary in transformer 131, a voltage drop of 12 volts across the apparatus 21 is less than 0.2% and is therefore, negligible. In the normal operation of the system, the primary neutral to secondary neutral voltage seldom exceeds several volts (unless, of course, faults, poor grounds, or other problems exist). At these voltage levels, the apparatus 21 has a very high impedance (over 750 ohms), effectively preventing the primary neutral voltage and current from entering the secondary neutral circuit and subsequently the system grounding conductors such as lines 187 and 207. 60 Hz. fault current capacity of apparatus 21 can exceed 5000 amperes. Surge protection is provided by silicon oxide varistor (SOV) 51 rated at 80,000 amperes and 10000 joules.

Apparatus 21 constitutes stray voltage reduction apparatus for installation in an electrical power system to complete a path of electrical continuity between a primary neutral of a power distribution transformer and a grounding conductor at a service entrance, the primary neutral being also attached to a ground connection but nevertheless having a stray voltage relative to true earth which would appear on the grounding conductor at the service entrance if the primary neutral were directly connected to the grounding conductor at the service en- trance.

The power distribution transformer 131 has the secondary neutral connected directly to the grounding conductor at the service entrance. The turns of the coil 27 of apparatus 21 have a sufficient ampacity (current carrying capacity in amperes) to safely pass a current in excess of a fuse level coordinated with the maximum primary current of the power distribution transformer but lower than the maximum secondary current of the power distribution transformer. For example, a 10 ampere fuse level is coordinated with a 7 ampere maximum primary current. A 15–20 ampere rating for the wire of coil 27 is generally a sufficient ampacity when the fuse level is 10 amperes. In this way, the coil is adapted for connection between the primary and secondary neutrals of the distribution transformer to complete the path of electrical continuity.

In an alternative connection scheme, a stray voltage reduction apparatus 221 constructed as shown in FIGS. 2 and 4 is used. The power distribution transformer 131 is wired so that the secondary neutral 129 is connected directly to the primary neutral 127 by a bonding strap instead of apparatus 21 of FIG. 5. Primary neutral 127 is also connected directly to a neutral terminal at the service entrance. In this alternative scheme, the turns of the coil 27 of apparatus 221 are made to have a sufficient ampacity to safely pass a current in excess of a fuse level coordinated with the maximum secondary current rating of the service entrance. For example, when the maximum secondary current rating of the service entrance is 400 amperes, a fuse level coordinated therewith is 450 amperes, and coil 27 should have an ampacity such as 500 amperes which exceeds the 350 ampere fuse level. In this way the coil is adapted for connection between the neutral terminal at the service entrance and the grounding conductor at the service entrance to complete the path of electrical continuity. Conductor 223 is removed so that only apparatus 221 is connected between neutral terminal N and ground terminal G of service entrance 171 in this alternative connection scheme.

It is evident that the alternative connection scheme just described places a higher ampacity requirement on coil 27. This means that a larger wire size is needed than in apparatus 21 and this can drive the cost of the apparatus up. Also, applicable codes such as the National Electrical Code in the U.S.A. should be checked, since this alternative connection scheme may not be permitted in all areas. The invention should, of course, only be installed in conformance with applicable regulations.

During installation of apparatus 21 in the FIG. 5 connection scheme basic saturation levels are easily checked with an isolated variable AC voltage source (not shown) with zero to 20 volts output (minimum 100 volt-amperes) and a clamp-on ammeter. The service entrance switch is opened, and then one side of the variable voltage source is connected to the service entrance neutral and the other side to an insulated wire connected to the ground connection 149 from the primary neutral 127 of the transformer 131. The clamp-on should show no current flow on the lowest current scale for voltages between zero and approximately 7 to 8 volts. Then the voltage is increased to about 11 volts, and current flow should rise very sharply to the amperage capacity of the power supply. This indicates proper operation of apparatus 21.

Apparatus 21 is hermetically sealed for protection and safety. It is relatively small, weighing under 10 pounds in a preferred embodiment, and occupying less than 1/10 cubic foot. It is conveniently pole mounted directly below the distribution transformer. Only two connections are required—one to the transformer can (primary neutral) and the other to the secondary neutral 129 at bushing 140B. Any existing bonding jumper between the primary and secondary neutral is then removed.

All applicable electrical code regulations (including the National Electrical Safety Code, NESC, and the National Electrical Code, NEC) should be reviewed and appropriate installation procedures should be established accordingly. Installation should be performed by qualified personnel with due physical and electrical safety precautions. Power company cooperation and approval should be obtained.

Measurements of original conditions should be taken prior to installation of apparatus 21, when the service entrance 171 neutral N is still connected to the primary neutral 127. Connect the voltmeter to reference earth E, i.e., one additional isolated ground rod for earth reference, and to the primary neutral 127 and record voltages under typical loads and with the service disconnect open. These readings indicate the typical range of voltages (0–10 volts) being coupled into the service ground 180.

In pole-mounting near the transformer 131, apparatus 21 should be the only interconnection between the primary grounded neutral 127 and the secondary grounded neutral 129. Apparatus 21 isolates primary neutral 127 from the secondary neutral 129 during normal operation, yet couples the grounded conductors together during faults to maintain safety of the service.

After securely mounting the apparatus 21 to the pole 101, remove all existing bonds from the secondary neutral bushing 140B and disconnect the secondary neutral conductor. Install a conductor 123 from the primary neutral 127 of the transformer 131 to one terminal 43 of apparatus 21. Existing ground conductors should also remain connected to the primary neutral 127. Reconnect the secondary neutral conductor to the secondary neutral bushing 140B. The secondary neutral conductor should not contact the transformer case 131, container 91 of apparatus 21, or any primary neutral conductor. Connect one insulated wire to the isolated reference earth ground rod.

Prior to the final connection to apparatus 21 by conductor 121, connect voltmeter leads to reference earth and the secondary neutral 129, and connect ammeter leads to primary neutral 127 and secondary neutral 129. Readings on the meters should be taken simultaneously and recorded. The service ground impedance 191 may then be calculated by dividing the voltmeter reading by the ammeter reading. The current may measure 50 milliamperes to several amperes. If only one multimeter is available, connect as an ammeter to primary neutral 127 and secondary neutral 129 and record current. Disconnect the meter, connect a jumper between primary neutral 127 and secondary neutral 129, and connect as a voltmeter between secondary neutral 129 and reference earth. Next an open bond test is performed by disconnecting the ammeter and recording the primary neutral and secondary neutral voltage relative to reference earth. The primary neutral 127 will typically be 0 to 10 volts; higher voltages indicate possible neutral faults. The secondary neutral 129 should be near zero, and any significant voltage thereat indicates that secondary neutral 129 has not been electrically disconnected or isolated from the primary neutral 127.

Finally the other insulated wire 121 is connected to the remaining terminal 41 of apparatus 21. Service is energized. Voltage measurements may then be taken with the service disconnect open and under typical load with it closed. Primary neutral 127 voltages in excess of 10 volts indicate possible faults in the neutral conductor or grounding, i.e. off-site problems. Because of the advantageous isolation provided by the invention it can be concluded that voltages appearing on the secondary neutral 129 are the result of neutral voltage drop due to secondary neutral current and/or secondary faults, i.e. on-site problems.

It is contemplated that a transformer manufacturer can also mount apparatus 21 on the transformer case or tank 139 inside or outside the transformer in the original process of manufacture. Preferably, core 23 is magnetically isolated from any magnetic fields generated in transformer 131 so that the advantageous characteristics (see FIG. 3) of apparatus 21 are not affected.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Stray voltage reduction apparatus used in an electrical power system to complete a path of electrical continuity between a primary neutral of a power distribution transformer and a grounding conductor at a service entrance, the primary neutral being also attached to a ground connection but nevertheless having a stray voltage relative to true earth which would appear on the grounding conductor at the service entrance if the primary neutral were directly connected to the grounding conductor at the service entrance, the stray voltage reduction apparatus comprising a coil having turns wound around a core establishing a magnetic circuit for the coil, and the core being made of a material having an initial permeability in excess of about 50,000 times that of free space and being substantially saturated at a saturation voltage which occurs when the flux density is no more than about 10,000 gauss, the coil being wound around the core to have an impedance at 60 Hz. of at least approximately 750 ohms, and said impedance decreases as the voltage across the coil near saturation increases towards said saturation voltage and said impedance reaches a value of less than an ohm when the voltage across the coil is greater than said saturation voltage the impedance substantially reducing the stray voltage at the grounding conductor at the service entrance.

2. Stray voltage reduction apparatus as set forth in claim 1 wherein the core is made of an alloy having a composition of approximately 80 percent nickel, approximately three to six percent molybdenum, and the balance being iron.

3. Stray voltage reduction apparatus as set forth in claim 1 further comprising a silicon oxide varistor connected across the coil.

4. Stray voltage reduction apparatus as set forth in claim 1 further comprising means connected across the coil for passing any high frequency electrical surges around the coil.

5. Stray voltage reduction apparatus as set forth in claim 1 further comprising means for hermetically sealing the core and coil.

6. Stray voltage reduction apparatus as set forth in claim 1 further comprising means for holding the core and coil which is adapted for mounting on a power pole with the power distribution transformer.

7. Stray voltage reduction apparatus as set forth in claim 1 wherein the core and coil are so arranged and constructed in dimensions and turns that the core is saturated by a 60 Hz. voltage having a voltage value between about 5 and 15 volts.

8. Stray voltage reduction apparatus as set forth in claim 1 used with a power distribution transformer having a secondary neutral connected directly to the grounding conductor at the service entrance, wherein the turns of the coil have a sufficient ampacity to safely pass a current in excess of a fuse level coordinated with the maximum primary current of the power distribution transformer but less than the maximum secondary current of the power distribution transformer, whereby the coil is adapted for connection between the primary and secondary neutrals of the distribution transformer to complete said path of electrical continuity.

9. Stray voltage reduction apparatus used between primary and secondary neutrals of a power distribution transformer having a primary rated for a maximum current, the primary neutral being attached to a ground connection but nevertheless having a stray voltage relative to true earth which would appear on the secondary neutral if the secondary neutral were directly connected to the primary neutral and to a grounding conductor at a service entrance, the stray voltage reduction apparatus comprising a coil having turns with a sufficient ampacity to safely pass a current in excess of a fuse level coordinated with the maximum primary current of the power distribution transformer, the coil being wound around a core establishing a magnetic circuit for the coil, and the core being made of a material having an initial permeability in excess of about 50,000 times that of free space and being substantially saturated at a saturation voltage which occurs when the flux density is no more than about 10000 gauss, the coil being wound around the core to have an impedance at 60 Hz. of at least approximately 750 ohms, and said impedance decreases as the voltage across the coil near saturation increases towards said saturation voltage and said impedance reaches a value of less than an ohm when the voltage across the coil is greater than said saturation voltage the core, the core and coil being so arranged and constructed in dimensions and turns that the core is substantially saturated by a 60 Hz. voltage having a value between 5 and 15 volts, the impedance substantially reducing the stray voltage at the secondary neutral of the power distribution transformer.

10. Stray voltage reduction apparatus as set forth in claim 9 wherein the core is made of an alloy having a composition of approximately 80 percent nickel, approximately three to six percent molybdenum, and the balance being iron.

11. Stray voltage reduction apparatus as set forth in claim 9 further comprising a silicon oxide varistor connected across the coil.

12. Stray voltage reduction apparatus, as set forth in claim 9 further comprising means connected across the coil for passing any high frequency electrical surges around the coil.

13. Stray voltage reduction apparatus as set forth in claim 9 further comprising means for hermetically sealing the core and coil.

14. Stray voltage reduction apparatus as set forth in claim 9 further comprising means for holding the core and coil which is adapted for mounting on a power pole with the power distribution transformer.

15. Electrical apparatus used in supplying electrical power to a service entrance having a grounding conductor, comprising:
a power distribution transformer having a secondary neutral attachable to the grounding conductor at the service entrance and a primary neutral attachable to a ground connection which when the transformer is energized would nevertheless present a stray voltage relative to true earth on the grounding conductor at the service entrance if the primary and secondary neutrals were directly connected to each other; and
a magnetizable core and a coil having turns wound around the core, coil being connected between the primary neutral and the secondary neutral of the power distribution transformer, the core establishing a magnetic circuit for the coil which is magnetically isolated from the power distribution transformer and made of a material having an initial permeability in excess of about 50,000 times that of free space and which is substantially saturated at a saturation voltage which occurs when the flux density is no more than about 10,000 gauss, the coil being wound around the core to have an impedance at 60 Hz. of at least approximately 750 ohms, and said impedance decreases as the voltage across the coil near saturation increases towards said saturation voltage and said impedance reaches a value less than an ohm when the voltage across the coil is greater than said saturation voltage, whereby the stray voltage is substantially reduced.

16. Electrical apparatus as set forth in claim 15 wherein the core is made of an alloy having a composition of approximately 80 percent nickel, approximately three to six percent molybdenum, and the balance being iron.

17. Electrical apparatus as set forth in claim 15 further comprising a silicon oxide varistor connected across the coil.

18. Electrical apparatus as set forth in claim 15 further comprising means connected across the coil for passing any high frequency electrical surges around the coil.

19. Electrical apparatus as set forth in claim 15 wherein the core and coil are so arranged and constructed in dimensions and turns that the core is saturated by a 60 Hz. voltage having a voltage value between about 5 and 15 volts.

20. Electrical apparatus as set forth in claim 15 wherein the turns of the coil have a sufficient ampacity to safely pass a current in excess of a fuse level coordinated with the maximum primary current of the power distribution transformer but less than the maximum secondary current of the power distribution transformer.

* * * * *